Aug. 14, 1934. K. SCHÖTTER 1,970,059
PIPE COUPLING
Filed Feb. 2, 1932

Inventor
Karl Schötter
By B Singer, atty

Patented Aug. 14, 1934

1,970,059

UNITED STATES PATENT OFFICE 1,970,059

PIPE COUPLING

Karl Schötter, Linz, Austria

Application February 2, 1932, Serial No. 590,502
In Austria February 6, 1931

1 Claim. (Cl. 285—120)

My invention relates to a screw sleeve and especially to an arrangement in which the connecting tube of a fixed radiator, boiler or the like terminates at a distance from the supply pipe and these two tubular portions are connected by a sleeve, which slides on the connecting tube or on the supply pipe.

The invention comprises a sleeve which loosely surrounds the thread of the supply pipe and may be screwed on the thread of the connecting tube until the cones of the connecting tube and sleeve closely contact each other, whereupon by means of a nut which may be screwed on the thread the cones of the supply pipe and sleeve are tightly pressed one to the other.

The sleeve is provided with a single conical surface, which serves simultaneously as tightening surface for the cones of the connecting tube and the supply pipe.

Figure 1:
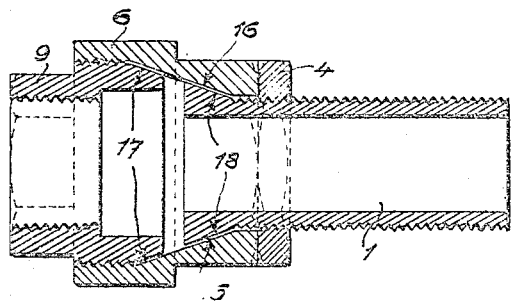
Figure 1 is a longitudinal central sectional view of a pipe coupling constructed and arranged in accordance with my invention.
Figure 2:
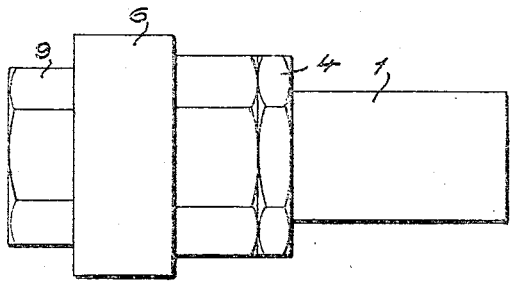
Figure 2 is an elevation of the same.

In accordance with my invention the connecting tube 9 of the radiator or the like is connected to the supply pipe 1 by means of screw sleeve 6. The sleeve 6 has only a single conical surface 16, which is tightly pressed to the conical surface 17 of the connecting tube 9, if the sleeve is screwed on said tube 9. This single surface 16 provides also the conical tightening surface engaging the cone 18 of the supply pipe 1, when the nut 4 is turned.

The two cones 17 and 18 are parallel with the cone 16, which enlarges outwardly. The tightening of the cones may be improved by inserting copper sheet.

The cone 16 may be made so as to form a double cone or a pair of cones one of which bearing on the conical surface 17, the other on the conical surface 18. But the simpler form is that with a single conical surface 16 to which the conical surfaces 17, 18 being parallel to each other and to the conical surface 16 are pressed.

The sleeve is of simple form, and suitable for inexpensive methods of manufacture.

When the coupling is slackened off, the nut 4 can be run back on the threading of the supply pipe 1, after which the sleeve 6 can be slid back on the latter without turning, since it is loosely fitted thereon.

When the coupling is slackened by running back the nut 4, and unscrewing and sliding back the sleeve 6, the radiator or other unit attached to the connecting tube 9 can always be detached and removed without difficulty, since the ends of the two pipes united by the coupling are spaced apart, and not in abutting or conically interlocking engagement as in the hitherto known types of pipe couplings.

To connect up the coupling, the sleeve 6 is slid up the supply pipe 1, and screwed on to the threaded collar on the end of the connecting tube until the upper portion of its conical surface 16 is a wringing fit on the conical surface 17 on this collar. According to the initial spacing between the ends of the two pipes, the conical surface 18 on the supply pipe 1 will then be in contact with or more or less spaced from the lower portion of the conical surface 16. These two surfaces, that is to say 16 and 18, are then brought into wringing fit with each other by the tightening up of the nut 4 against the end of the sleeve 6, utilizing the natural elasticity or "give" of the pipe system. It will thus be clear that the surfaces 16 and 17 are contacted by screwing together the threads 14 and 15 on the parts 6 and 9 respectively, while the surfaces 16 and 18 are contacted independently by the tightening up of the nut 4 against the end of the sleeve 6. A tight and reliable joint is thus formed between two pipes spaced as to their ends, without the employment of packing material of any kind, it being merely necessary for the achievement of this result that all three conical surfaces provided shall be tapered in the same direction and shall have the same angle at the apex, that is to say shall be of the same conicity.

What I claim is:

A pipe coupling comprising an exteriorly threaded supply pipe having a conical surface on its outer end portion, a second pipe in spaced end-to-end relation to the said first pipe and having an exteriorly threaded end-collar terminating in a portion with a conical surface, a sleeve loose on the said first pipe and having interior threading at its forward end adapted to engage the said threaded collar, a conical surface on the inside of the said collar of a continuous length equal to at least the sum of the lengths of the two conical surfaces aforesaid plus the width of the gap between the ends of the said pipes, all the said conical surfaces being smooth, tapered in the same direction, and of equal conicity, and a nut threaded on the said supply pipe and adapted to bear against the end of the said sleeve.

KARL SCHÖTTER.